(12) United States Patent
Daniel

(10) Patent No.: US 8,074,878 B1
(45) Date of Patent: Dec. 13, 2011

(54) SYSTEM AND METHOD OF PRE-APPROVING APPLICANTS FOR VISA PROCESSING USING AN EMERGING COUNTRY'S INTERNATIONAL TRAVEL APPROVAL CONTROL CARD

(75) Inventor: Isaac Sayo Daniel, Miami, FL (US)

(73) Assignee: F3M3 Companies, Inc., Miramar, FL (US)

( * ) Notice: Subject to any disclaimer, the term of this patent is extended or adjusted under 35 U.S.C. 154(b) by 0 days.

(21) Appl. No.: 12/730,990

(22) Filed: Mar. 24, 2010

Related U.S. Application Data

(63) Continuation-in-part of application No. 12/584,375, filed on Sep. 4, 2009, now Pat. No. 7,975,914, and a continuation-in-part of application No. 12/626,841, filed on Nov. 27, 2009, now Pat. No. 7,950,577.

(60) Provisional application No. 61/277,989, filed on Sep. 29, 2009.

(51) Int. Cl.
*G06K 5/00* (2006.01)

(52) U.S. Cl. ......... 235/380; 235/439; 235/488; 235/492

(58) Field of Classification Search .................. 235/380, 235/439, 488, 492
See application file for complete search history.

(56) References Cited

U.S. PATENT DOCUMENTS

| | | | |
|---|---|---|---|
| 7,817,821 B2 * | 10/2010 | Milne et al. .................. | 382/100 |
| 2002/0100802 A1 * | 8/2002 | Sehr .............................. | 235/384 |
| 2006/0005050 A1 * | 1/2006 | Basson et al. ................ | 713/194 |
| 2008/0019578 A1 * | 1/2008 | Saito et al. .................... | 382/124 |
| 2008/0272196 A1 * | 11/2008 | Basson et al. ................ | 235/487 |
| 2009/0084858 A1 * | 4/2009 | Borracci ....................... | 235/492 |
| 2010/0039225 A1 * | 2/2010 | Yu et al. ....................... | 340/5.83 |
| 2010/0108771 A1 * | 5/2010 | Wong et al. .................. | 235/492 |
| 2010/0250945 A1 * | 9/2010 | Brown et al. ................. | 713/172 |

* cited by examiner

*Primary Examiner* — Allyson Trail
(74) *Attorney, Agent, or Firm* — Carol N. Green, Esq.

(57) ABSTRACT

The present disclosure relates generally to a system and method, and more particularly to a system and method of pre-approving applicants for visa processing using an emerging country's international travel approval control card, i.e. an electronic data card that includes biometric verification means for verifying a biometric identifier stored thereon, used to uniquely identify the card holder to a local foreign embassy as pre-approved for visa application processing.

28 Claims, 9 Drawing Sheets

SYSTEM AND METHOD OF PRE-APPROVING APPLICANTS FOR VISA PROCESSING USING AN EMERGING COUNTRY'S INTERNATIONAL TRAVEL APPROVAL CONTROL CARD

PRIORITY CLAIM

This patent application is a continuation in part of, and claims priority to U.S. Non-Provisional patent application Ser. No.: (12/584,375) titled An Apparatus, System And Method For Storing Visa Application Information filed Sep. 4, 2009 now U.S. Pat. No. 7,975,914 and the U.S. Provisional Patent Application Ser. No.: (61/277,989) titled A Method Of Processing An Immigration Customs Visa Card filed on Sep. 29, 2009; U.S. Non-Provisional patent application Ser. No.: 12/626,841, titled An Apparatus, System And Method For Verifying Authorized Entry Using An Immigration Customs Visa Card filed Nov. 27, 2009 now U.S. Pat. No. 7,950,577. The entire disclosures of the afore-mentioned applications are incorporated by reference as if fully stated herein.

FIELD OF THE INVENTION

The present disclosure relates generally to a system and method, and more particularly to a system and method of pre-approving applicants for visa processing using an emerging country's international travel approval control card, i.e. an electronic data card that includes biometric verification means for verifying a biometric identifier stored thereon, used to uniquely identify the card holder to a local foreign embassy as pre-approved for visa application processing.

BACKGROUND OF THE INVENTION

In the wake of the terrorist attacks of Sep. 11, 2001 many developed countries have implemented new security measures with more stringent rules in an effort to minimize and/or eliminate the threat of terrorism within their country's borders. One such recent measure requires permanent residents who would like to visit a G8 foreign country to return to their birth country to apply for visas from the foreign embassy of the intended destination country. However, many permanent residents have established their roots abroad in the countries in which they reside, with minimal or no ties with their birth country having migrated many years earlier. These visa applicants, who may be model permanent residents, are now at a disadvantage as foreign embassies generally require proof of residency in the birth country, i.e. demonstrate sufficient ties exemplifying an intent to return. Therefore, a visa applicant may be asked to produce documentary evidence like bank records for a local bank account, utility bills showing a local resident address, mortgage or lease statements, and/or demonstrate civic involvement and the like in an interview. With these requirements in place, a significant number of visa applicants will be unable to qualify for foreign visas as they lack the necessary documentation.

Compounding the problem is the fact that many permanent residents either cannot, or choose not to return to their birth country because of political reasons, threat of violence, e.g. robbery, kidnapping, etc. Accordingly, requiring permanent residents to return to their birth country to apply for foreign visas effectively places an unnecessary limitation on permanent resident's ability to travel. Thus, there needs to be a system and method for allowing permanent residents residing in foreign countries to obtain foreign visas without having to return to their birth country to obtain the same. It is understood that any such process needs to be implemented without compromising the approval process for granting visas.

Accordingly, the various embodiments and disclosures described herein satisfies these long felt needs and solves the limitations of the prior art in a new and novel manner.

SUMMARY OF THE INVENTION

An objective of the system and method disclosed herein is to provide an emerging country's international travel approval control ("ECITAC") card that may be used as valid identification for a visa applicant as pre-approved for visa processing.

Another objective of the system and method disclosed herein is to provide an ECITAC card, which is selected from a group of electronic devices consisting essentially of smart cards, memory cards, and microprocessor cards, with memory means embedded therein for storing visa application information and or a biometric identifier.

Yet another objective of the system and method disclosed herein is to provide an ECITAC card that includes biometric verification means positioned thereon for receiving and storing a biometric identifier used as a unique identifier for the card holder.

ECITAC card, which includes an electronic data card, is a functional component of a system and method. The electronic data card is selected from the group of electronic devices comprising essentially of smart cards. The system and method further comprises of: an electronic data card configured for electronically storing thereon a biometric identifier; biometric verification means positioned on the electronic data card, where the biometric verification means is configured for validating a visa applicant's biometric sample by comparing the biometric sample with the biometric identifier stored on the ECITAC card and/or with the foreign embassy; and a passport reader connected to a computer, wherein the passport reader is configured for reading the electronic data card for verifying the visa applicant's pre-approval status for a travel visa at a local foreign embassy, i.e. foreign embassy situated in the country where visa applicant resides. In some embodiments, system includes a kiosk adapted to include one or more passport readers connected to a computer.

System and method may include software components, which may comprise of at least one processor; an application program executable on the computer and a computer processor with executable instruction code configured for performing the varied functions of the system and methods of the invention. For example, computer executable instructions executable by at least one computer processor may be configured to perform any one or more of the following: control the passport reader to read an electronic data card; receive a biometric sample used to verify the identity of the visa applicant; compare the biometric sample with the biometric identifier previously stored for the visa applicant; and review a background report to determine the visa applicant's pre-approved status for visa processing at a local foreign embassy, i.e. a foreign embassy in the country where visa applicant currently resides.

The electronic data card is configured for being accessed by the application program executable on the computer and is also configured for receiving a valid biometric sample from the visa applicant. The first valid biometric sample may be obtained via the biometric verification means position thereon. Biometric verification means as used herein includes but is not limited to: fingerprint recognition means, hand geometry recognition means, palm geometry recognition means, iris recognition means, retina recognition means, speech recognition means.

The electronic data card is also configured for communicating with the computer or passport reader in any of the following manner: wirelessly or wired as well as for being accessed by an application program. In some embodiments, the electronic data card includes memory means, wherein the memory means may include any one or more of the following stored thereon: a biometric sample, biometric identifier, background report, visa application information, or data structures. Visa application information as used herein includes but is not limited to: pre-approved status, photograph, issuing country, passport number, surname, given names, address, nationality, date of birth, place of birth, gender, race, height, color of eyes, passport number, date of issue, passport expiration date, occupation, place of issue, authority or endorsement. Data structures include but are not limited to: card number, security parameters, visa application information, card validation information, activity log and global positioning system location information.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the system and method may be derived by referring to the detailed description and claims when considered in connection with the Figures, wherein like reference numbers refer to similar items throughout the Figures.

DETAILED DESCRIPTION OF THE PREFERRED EMBODIMENT

System Level Overview

Figure 1A:
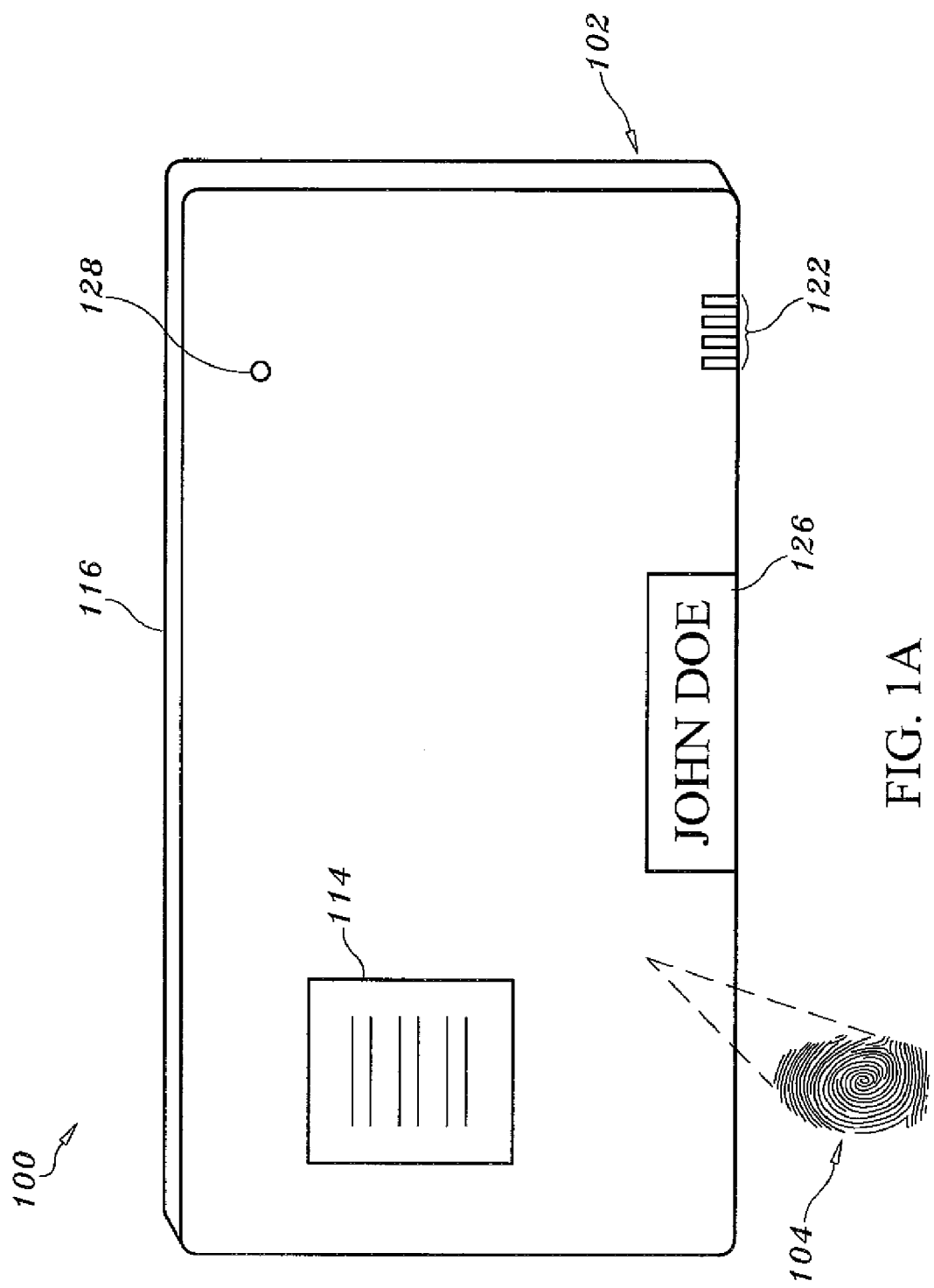
FIG. 1A is an exemplary embodiment of the ECITAC card according to one embodiment.

The following discussion describes in detail, varied embodiments of the system and methods disclosed herein. However, this discussion should not be construed, as limiting the invention to those particular embodiments, as practitioners skilled in the art will appreciate that the system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the various views.

Figure 1B:
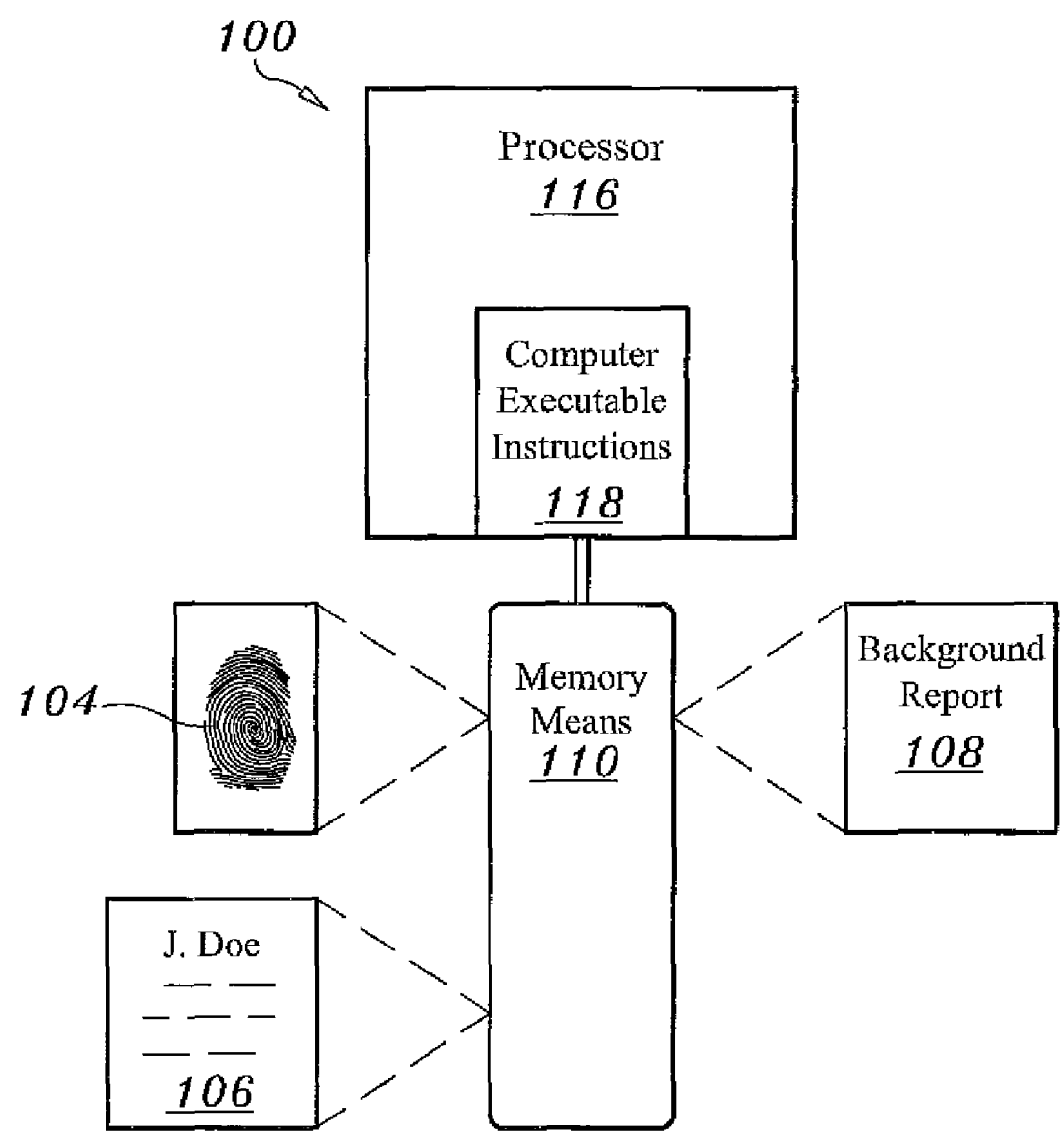
FIG. 1B is an exemplary embodiment of the ECITAC card according to one embodiment.
Figure 1C:
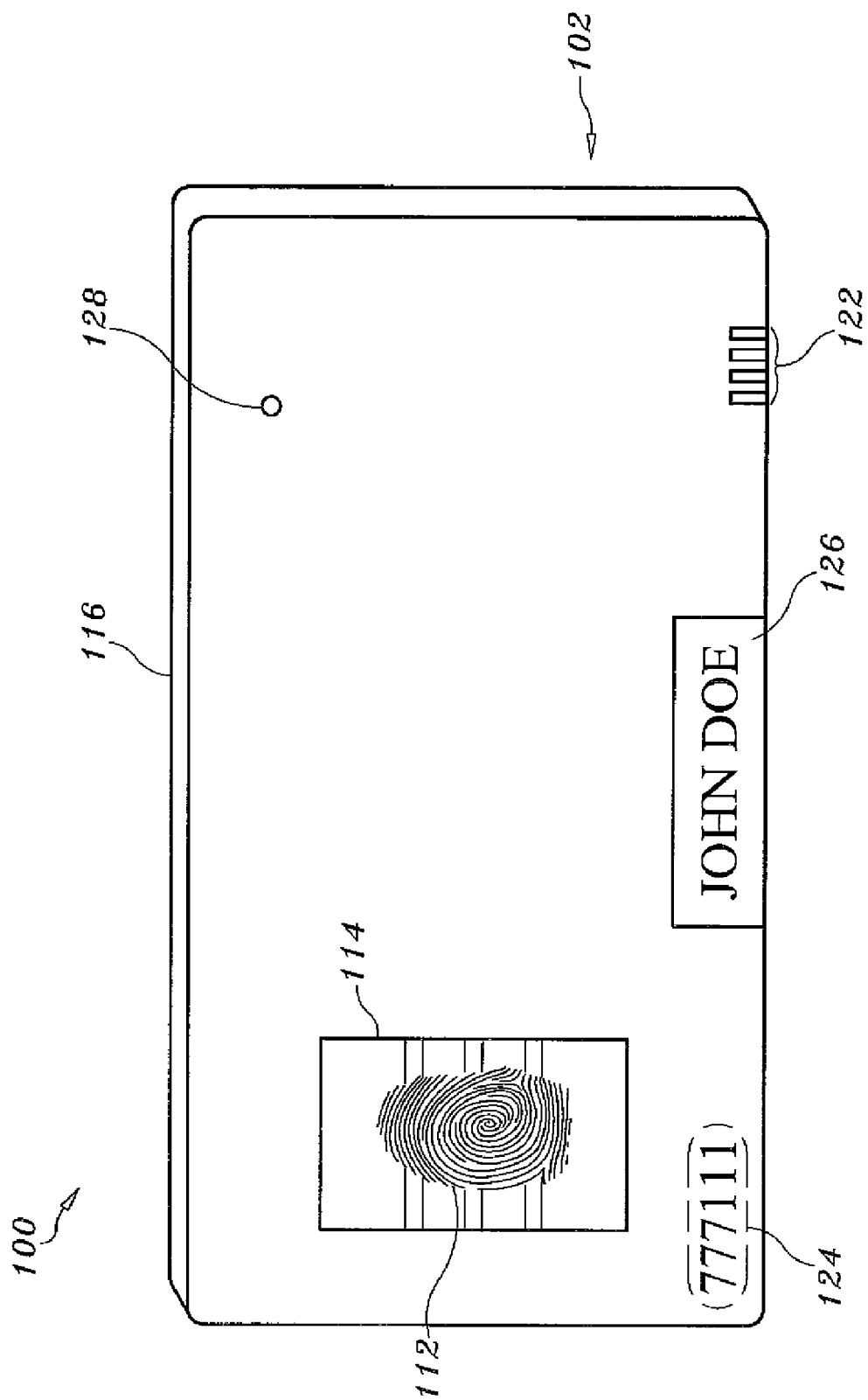
FIG. 1C is an exemplary embodiment of the ECITAC card according to one embodiment.

FIGS. 1A, 1B & 1C are exemplary embodiments of the ECITAC card 100. The ECITAC card 100, which is a functional component of the system, includes an electronic data card 102 configured for storing thereon any one or more of the following: a biometric identifier 104, visa application information 106 and/or background report 108. ECITAC card 100 is selected from the group of electronic devices consisting essentially of programmable smart cards, memory cards, and processor cards, with at least one memory means 110 embedded therein configured for storing any one or more of the following: a biometric identifier 104 and/or the ECITAC card holder's visa application information 106 and/or background report 108. Visa application information 106 as used herein includes any one or more of the following: pre-approved status, photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), and type of visa and the like.

Prior to the ECITAC card 100 being issued to a visa applicant, a biometric sample 112 is obtained from the visa applicant and enrolled as a biometric identifier 104, which may be stored on the ECITAC card 100 or with the foreign embassy for future reference and comparison. Biometric identifier 104 as used herein describes a biometric sample 112 that uniquely identifies the individual based on his/her intrinsic physical traits, e.g. fingerprints, retina scan, palm geometry, hand geometry, speech, and or other biometric identifiers 104, 104' that are used in the arts.

ECITAC card 100 also includes biometric verification means 114 positioned on the electronic data card 102, configured for validating a visa applicant's biometric sample 112 by comparing the biometric sample 112 with the biometric identifier 104. Biometric verification means 114 includes but is not limited to: fingerprint recognition means, hand geometry recognition means, palm geometry recognition means, iris recognition means, retina recognition means, speech recognition means and any other biometric verification means 114 that are known and used in the arts. Biometric verification means 114 may include at least one processor 116 positioned within the ECITAC card 100 and disposed in communication with, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry and such other biometric verification means 114 that are known and used in the arts. Illustratively, as seen in FIG. 1A, the biometric verification means 114 includes a fingerprint scanner, where the ECITAC processor 116 controls the functionality of the fingerprint scanner, generating the varied algorithms for storage of the first valid biometric sample 112 as a biometric identifier 104 and validates the images of subsequent biometric samples 112, 112' received from the ECITAC card holder.

In some embodiments, the ECITAC card 100 may not include a processor 116, while in other embodiments the ECITAC card 100 includes at least one processor 116 positioned within. Processor 116 may be any type of processor 116, such as, but not limited to, a central processing unit (CPU), a microprocessor, a video processor, a front end processor, a coprocessor, a single-core processor, a multi-core processor, as well as any known processor 116 that's used in the arts.

As shown in FIG. 1B, in some embodiments, embedded within the processor 116 are computer executable instructions 118 readable by the ECITAC card's at least one processor 116 where the computer executable instructions 118 are operative to perform the varied system functions of the ECITAC card 100. Computer executable instructions 118 may be any type of computer executable instructions 118, which may be in the form of a computer program, the program being composed in any suitable programming language or source code, such as C++, C, JAVA, JavaScript, HTML, XML, and other programming languages. The at least one processor 116 positioned within the ECITAC card 100 is configured for performing any one or more of the following: validating a biometric sample 112 with a biometric identifier 104 stored on the ECITAC card's at least one memory means 110; and communicating with a computer via an application program.

In some embodiments, the electronic data card includes at least one memory means 110 as exemplified in FIG. 1B. Such memory means 110 may include a hardware component, e.g. storage hardware, in electrical communication with at least one processor 116. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 110 may comprise of both hardware and software components. Memory means 110 may include any one or more of the following stored thereon: a biometric sample 112, biometric identifier 104, background report 108, visa application information 106, and/or data structures. In some embodiments, at least one memory means 110 may be embedded within at least one processor 116 where the information stored therein is encrypted for privacy purposes. In other embodiments, the at least one memory means 110 is adapted with electrical contacts for establishing wired and/or wireless connectivity with external devices, e.g. a computer and the memory means 110, via for example a microchip and/or at least one microprocessor 116 where the memory means 110 is embedded within.

In some embodiments, ECITAC card 100 may optionally include a battery 120 (not shown), which serves as a power source for the at least one processor 116 positioned therein. In some embodiment, ECITAC card 100 is adapted with electrical contacts 122 for establishing wired and/or wireless connectivity to a charger, e.g. a docking station, and as such may not include a battery 120 (not shown). In that event, processor 116 detects when the ECITAC card 100 has been disconnected from an external power source and switches ECITAC card 100's power source to an internal power source, such as the battery 120 (not shown).

FIG. 1C is an exemplary embodiment of the ECITAC card 100. In some embodiments, ECITAC card 100 may include an ECITAC card number 124, which acts as a unique identifier for the ECITAC card 100 and/or card holder. ECITAC card number 124 may be assigned via a random number generating program, comprising of numerals, characters, alphanumeric characters or any other unique identifiers that are known and used in the arts. Prior to being issued to the visa applicant, the ECITAC card number 124 may be recorded as another means of identifying the ECITAC card holder. ECITAC card 100 may also include other indicia of identification, e.g. the ECITAC card holder's name 126. In some embodiments, the card holder's address may also be printed on the ECITAC card's exterior and/or stored within the ECITAC card's memory means 110.

The ECITAC card holder's identity may also be verified to the appropriate authorities using the biometric verification means 114 stored thereon. For example, in instances where the biometric verification means 114 includes a fingerprint scanner, the ECITAC card holder may submit a biometric sample 112 using the same finger previously used to obtain the first valid biometric sample 112 stored thereon as the biometric identifier 104. If the biometric sample 112 matches the biometric identifier 104, the ECITAC card's at least one processor 116, which is disposed in communication with the fingerprint scanner, may activate a display means 128, which may include a Light Emitting Diode ("LED") display to shown for example a green light. In some embodiments, where the biometric sample 112 fails to match the biometric identifier 104 stored thereon, the display means 128 may be depict a red light.

Figure 2:
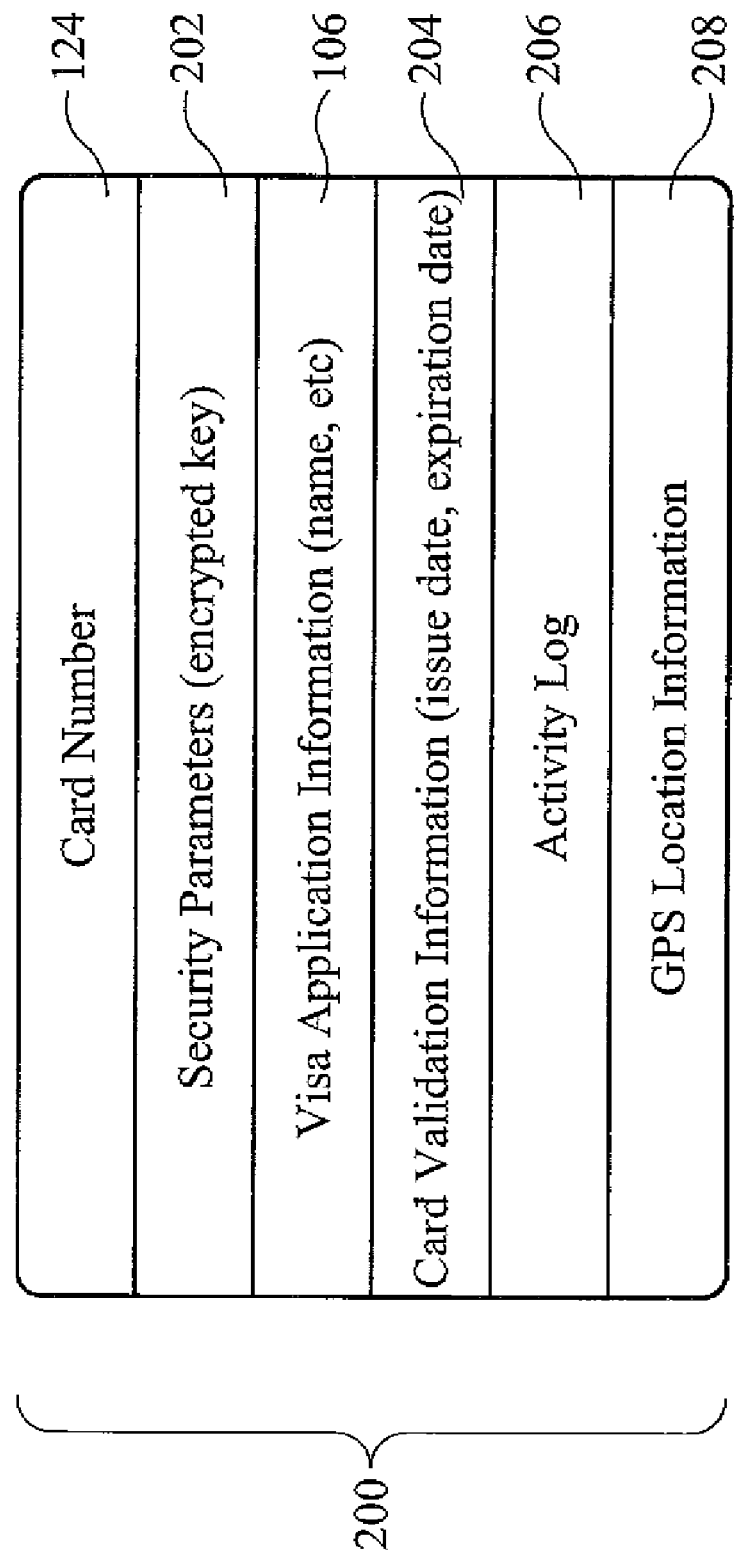
FIG. 2 illustrates, by way of example, collectively the data structures stored within an embodiment of the ECITAC card.

FIG. 2 illustrates, by way of example, collectively the data structures 200 stored within an embodiment of the ECITAC card 100. Data structures 200 are retained within the electronic data card's memory means 110, which preferably provides sufficient processing resources to facilitate communication and maintain adequate security for the card. Data structures 200 includes but is not limited to: card number 124, security parameters 202, visa application information 106, card validation information 204, activity log 206 and Global Positioning System ("GPS") location information 208. Card number 124 may act as a unique identifier allowing the system to uniquely recognize and register each ECITAC card 100 that has been assigned and issued to individual card holders. Security parameters 202 may be provided, that may include an encrypted key(s) of military grade, and or security codes, biometric security features, and/or other security mechanisms.

Visa application information 106 for the card recipient may be stored thereon which include but is not limited to pre-approved status, photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), and type of visa and the like. It will be understood that access to the visa application information 106 may be provided in a hierarchical form associated with security provisions to protect the information stored on the ECITAC card 100.

Card validation information 204 may include for example issue date that corresponds to the date the ECITAC card was issued to the visa applicant, and/or card expiration date, which corresponds to the expiration date of the ECITAC card 100. Activity log 206 may optionally contain a record of all uses of the ECITAC card 100, e.g. embassies for which the ECITAC card 100 was presented as a means of identifying the card holder's pre-authorized status for a travel visa. Background report 108 may be stored in ECITAC card's memory means 110, which may include a report based on a verification of the information provided by the visa applicant prior to obtaining an ECITAC card 100. Background report 108 may include but is not limited to information concerning a criminal background check, verification of local address, bank account information, verification of education and the like. Included in the background report 108 may be a flag indicating the pre-approved status of the visa applicant showing whether visa applicant qualifies for a travel visa from a local foreign embassy and/or if not, then why. In this manner, the local foreign embassy can readily determine the visa applicant's pre-approved status for a visa application from the ECITAC card 100.

In some embodiments, the ECITAC card 100 may include GPS location determining means 210 (not shown), e.g. a GPS transponder, for determining the location of the ECITAC card 100 with means for encoding 212 (not shown) the location into an electronic signal 214 (not shown) using e.g. a processor 116, e.g. a microprocessor, which is transmitted to an authorized institution 216 (not shown) where the transmitted electronic signal 214 (not shown) is decoded and the location of the ECITAC card 100 or use activity may be monitored in real-time. Therefore, the location of the ECITAC card 100 and as such the location of the ECITAC card holder may be determined in real-time via global satellite system, where the information, i.e. the longitude and latitude coordinates, may be stored in the GPS location information 208.

Figure 3:
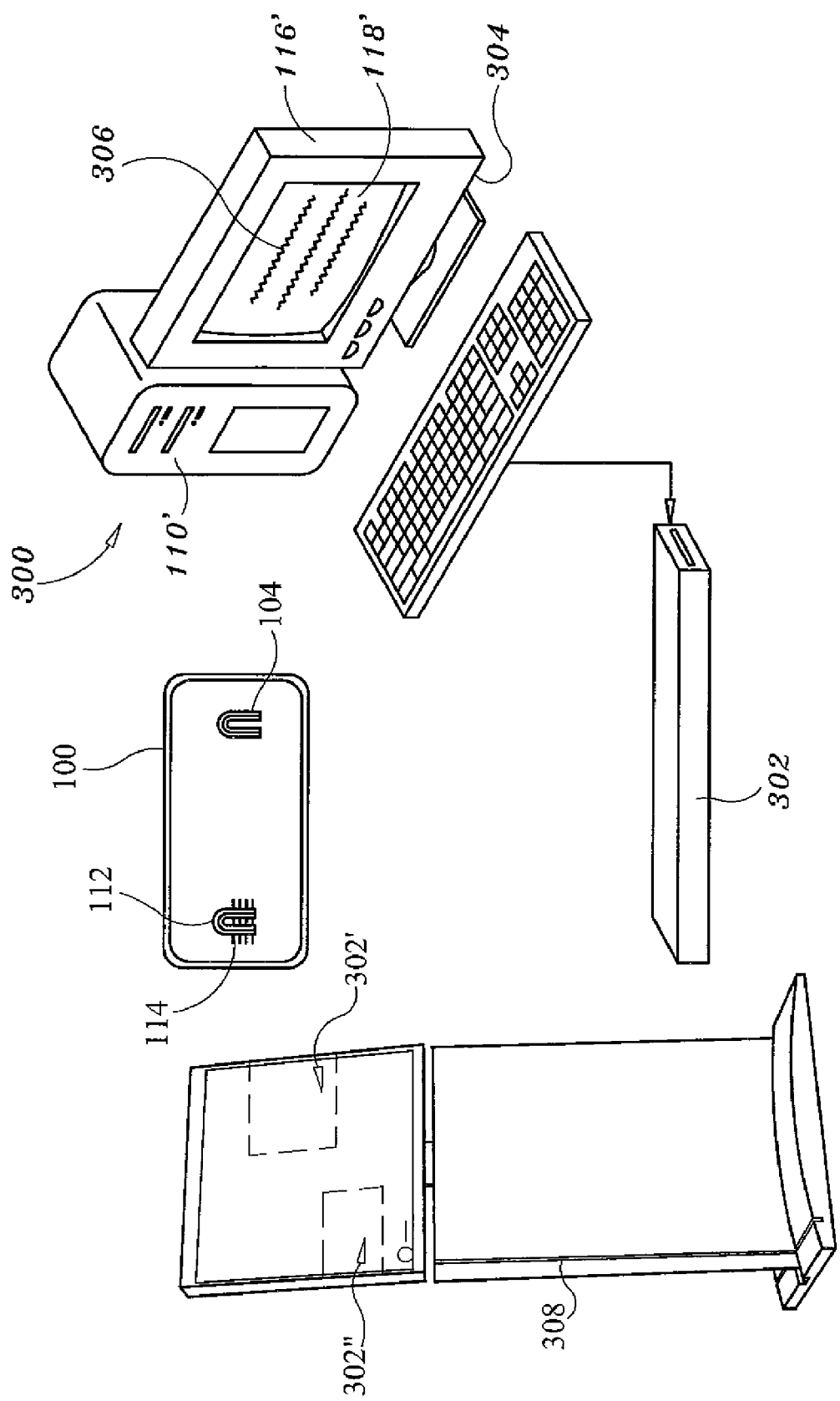
FIG. 3 shows a block diagram representing a system in accordance with one embodiment.

FIG. 3 is an illustrative diagram of an exemplary embodiment of the system 300. System 300 comprises of: an ECITAC card 100, which includes an electronic data card 102 configured for electronically storing thereon a biometric identifier 104; biometric verification means 114 positioned thereon, where the biometric verification means 114 is configured for validating a visa applicant's biometric sample 112 by comparing the biometric sample 112 with the biometric identifier 104 stored thereon and a passport reader 302 connected to a computer 304, wherein the passport reader 302 is configured for reading the electronic data card 102 for verifying the visa applicant's pre-approval status for a foreign visa at a local embassy. In some embodiments, system 300 may also include an application program 306 executable on a computer 304; and computer executable instructions 118 executable by the at least one computer processor 116' and configured to perform any one or more of the following: control the passport reader 302 to read an electronic data card 102; receive a biometric sample 112 used to verify the identity of the visa applicant; compare the biometric sample 112 with the biometric identifier 104 previously stored for the visa applicant; and review a background report 108 to determine the visa applicant's pre-approved status for a foreign visa at a local embassy.

Using this system 300 disclosed herein, a visa applicant seeking to obtain a travel visa to a foreign country no longer needs to return to his/her birth country to submit the visa application to the foreign embassy of the intended destination country. According to one embodiment, visa applicant may submit his/her visa application information 106 for pre-approval status, for which a background check may be conducted, where the visa applicant will be required to submit a first valid biometric sample 112 that may be stored as a biometric identifier 104, and may be shared with the foreign embassy and/or consulate from which visa applicant is seeking a travel visa.

In some embodiments, the ECITAC card 100 is only issued to a pre-approved visa applicant whose background check has revealed no negative history or there are no other disqualifying factors, e.g. close relative of known terrorist, which would prevent the visa applicant from qualifying for a visa. In other embodiments, the ECITAC card 100 is issued to a visa applicant even though he/she may have failed the background check or has other disqualifying factors that would prevent him/her from qualifying for a visa. However, in either embodiment, the visa applicant's pre-approved status (approved or denied) is stored on the ECITAC card 100.

As discussed supra, ECITAC card 100 includes an electronic data card 102 configured for receiving the first valid biometric sample 112 where it is stored thereon as a biometric identifier 104 uniquely identifying the visa applicant based on his/her intrinsic physical traits, e.g. fingerprints, retina scan, palm geometry, hand geometry, speech, and or other biometric identifiers 104, 104' that are used in the arts. In this manner, the ECTIAC card 100 is rendered useless if stolen as the ECITAC card 100 cannot be used to identify anyone other than the individual visa applicant to whom the ECITAC card 100 was issued. ECITAC card holder's identity may be further verified, e.g. in the presence of authorities at the local foreign embassy, where visa applicant may be required to submit a biometric sample 112 using the biometric verification means 114 positioned thereon. Here too, the biometric sample 112 will be compared to the biometric identifier 104 either stored on the ECITAC card 100 and/or with the foreign embassy's records. ECITAC card 100 is configured for being accessed by the application program 306 executable on a computer 304, automatically providing for example at least one or a plurality of the visa application information 106 stored thereon in response to a request for at least one or a plurality of the visa application information 106 when read by a passport reader 302.

Passport reader 302 describes a device for scanning and reading the ECITAC card 100 and the information stored thereon, e.g. biometric identifier 104, visa application information 106, background report 108 and/or any other information that is a part of the data structures 200 stored thereon. Passport reader 302 is connected to a computer 304, and is configured for reading or writing to the electronic data card 102 and in some embodiments for verifying the visa applicant's pre-approval status for a travel visa at a local foreign embassy, i.e. a foreign embassy in the country where visa applicant currently resides. Passport reader 302 is connected to a computer 304 either wirelessly or wired, wherein passport reader 302 is configured for scanning and reading any one or more of the following: the ECITAC card number 124, at least one biometric sample 112, biometric identifier 104 stored on the ECITAC card 100, the card holder's visa application information 106, background report 108 and/or any other component of the data structures 200 stored thereon. Passport reader 302 as exemplified herein may be adapted with electrical contacts 122 for establishing wired and/or wireless connectivity to ECITAC cards 100, 100', 100" and/or the computer 304. Alternatively, a wireless connection may be established, wherein communication access is established in response to proximity or manual activation of the passport reader 302. Passport reader 302 may also be integrated within a computer 304 (e.g. with a slot for wired card connectivity), an external device (e.g., USB connection to a small housing), or be integrated into other devices, e.g. a kiosk 308 that are known and used in the arts.

Kiosk 308 is an open, electronic, computerized booth which in some embodiments is adapted to include at least one or more passport readers 302, 302'. In some embodiments, the electronic kiosk 308 may be interactive without allowing the individual to access the system 100 functions, while in other embodiments, kiosk 308 is non-interactive. Kiosk 308 as used herein may include touch screens, trackballs, computer keyboards, and pushbuttons and the like. Alternatively, a wireless connection may be established, wherein communication access is established in response to proximity or manual activation of the passport reader 302.

Computer 304, e.g. a network enabled computer 304, i.e. a laptop or personal digital assistant subject to wired/wireless connectivity and is configured with an application program 306 stored thereon to facilitate communications between the ECITAC card 100 and the computer 304 through the passport reader 302. Application program 306 may comprise in part of a browser, such as for use on a personal computer 304 or similar browsing device.

System 300 may also comprise of computer executable instructions 118' executable by the computer's at least one processor 116', and operative to perform the system 300 and methods disclosed herein. Computer executable instructions 118' may be loaded directly on the computer's processor 116', or may be stored in computer's' memory means 110', such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 118' may be any type of computer executable instructions 118', which may be in the form of a computer program, the program being composed in any suitable programming language or source code, such as C++, C, JAVA, JavaScript, HTML, XML, and other programming languages. Computer executable instructions 118' are operative to perform any one or more of the following: control the passport reader 302 to read the electronic data card 102; receive a biometric sample 112 used to verify the identity of the visa applicant; compare the biometric sample 112 with the biometric identifier 104 previously stored for the visa applicant; and review a background report 108 to determine the visa applicant's pre-approved status for a foreign visa at a local embassy.

Computer's at least one processor 116' may be any type of processor, such as a central processing unit (CPU), a microprocessor, a front end processor, a coprocessor, a single-core processor, a multi-core processor, as well as any known processor 116' that's used in the arts.

As shown in FIG. 3, computer 304 is disposed in communication with memory means 110', i.e. illustratively an electronic database, configured for storing and maintaining information for at least one ECITAC card 100 for at least one ECITAC card holder. Memory means 110' may include a hardware component, e.g. storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, memory means 110' may include a software component, such as, but not limited to, an electronic database as illustrated in FIG. 3, file management software, and any other software component as used in the arts. In yet another embodiment, memory means 110 may comprise of both hardware and software components.

System 300 may include software components, which comprise of an application program 306 executable on the computer 304, where the computer 304 is configured for accessing an ECITAC card holder's visa application information 106 stored on its memory means 110.

In some embodiments, ECITAC card holder may be required to submit a biometric sample 112 in person at the foreign embassy. Passport reader 302, configured to read the ECITAC card 100, receives the biometric sample 112 used to verify the identity of the visa applicant. Computer's at least one processor 116' compares the biometric sample 112 with the biometric identifier 104 previously stored for the visa applicant, which may prompt a display of ECITAC card holder's visa application information 106 for a visual comparison of the identity of the ECITAC card holder. Here too, if the biometric sample 112 matches the biometric identifier 104, the authentication process is complete. However, if they fail to match, the embassy's immigration protocol will dictate further actions taken if any.

Passport reader 302 is also configured to read all the information stored on the ECITAC card 100, e.g. ECITAC card number 124, the biometric identifier 104, at least one visa application information 106, data structures 200 and the like, which are transmitted to the computer 304. Passport reader 302 is configured to read the ECITAC card number 124 either wirelessly or wired, and transmits that ECITAC card number 124 to the computer 304, where the ECITAC card 100 is authenticated as a valid issued card.

The ECITAC card holder's identity may also be verified via his/her biometric identifier 104, where the passport reader 302 is configured to read the biometric identifier 104 stored on the ECITAC card 100 or the card holder may be required to submit an in-person biometric sample 112 via the biometric verification means 114 positioned on the ECITAC card 100. In either event, biometric sample 112 is compared with the biometric identifier 104 stored on the ECITAC card 100 or with the foreign embassy. If the in-person biometric sample 112 matches the biometric identifier 104, the authentication results may be transmitted to the computer 304 via the passport reader 302, and the computer 304 retrieves the visa applicant's information stored on the computer's memory means 110. Accordingly, the retrieved visa application information 106 from the computer's memory means 110 can be compared visually with the physical description of the ECITAC card holder.

In another embodiment, the ECITAC card number 124, the biometric identifier 104 and/or at least one visa application information is stored on the ECITAC card 100.

Methods

Figure 4:
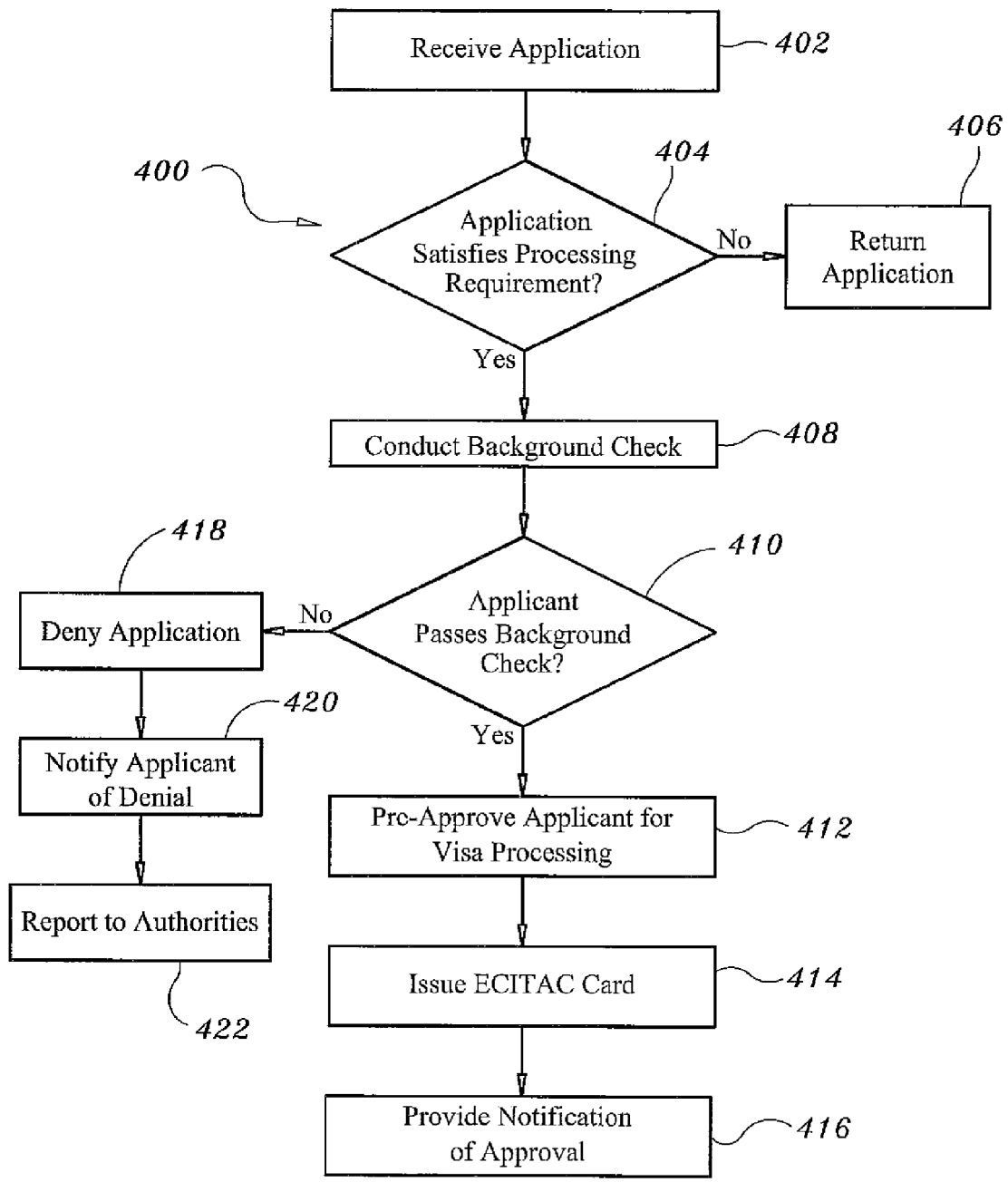
FIG. 4 is a sample flowchart of a block diagram of an exemplary method of processing an ECITAC card in accordance with one embodiment.

FIG. 4 is a sample flowchart of an exemplary method 400 of pre-approving a visa applicant for obtaining a foreign visa according to one embodiment. Method 400 comprises of receiving an application for an ECITAC card 100 (step 402) from a visa applicant for pre-approval of a travel visa from a local foreign embassy. Any foreign embassy implementing the system 300 and method 400 disclosed herein will have specific application processing requirements that must be met prior to visa applicant being issued an ECITAC card 100 appropriate for pre-approval status for that country, e.g. presentation of a valid birth certificate, verification of citizenship of birth country, health insurance, payment of applicable fees and the like. As such, visa applicant may be required to provide visa application information 106 and/or other documentation which may include, i.e. proof of domestic bank account, utility bills in applicant's name, local resident address, civic involvement, and the like. If the visa application and/or the submitted documentation fails to satisfy the local foreign embassy's application processing requirements, method 400 may require the return of the application 106 (step 406) to visa applicant. If however, the processing requirements are met (step 404) then the application will be advanced for conducting a background check (step 408).

The background check may be conducted internally, through third party investigators and/or at the direction of the local foreign embassy or consulate to comply with their respective requirements. As part of the background check, the visa applicant's criminal record may be verified as well as their residency status in the country in which they reside. In that event, visa applicant may be required to provide visa application information 106 and supporting documentation. In some embodiments, visa application information 106 is collected and shared with the appropriate foreign embassy or consulate. If visa applicant passes the background check (step 410) then visa applicant will be pre-approved for visa processing (step 412), which may include issuing an ECITAC card 100 (step 414) to visa applicant and providing notification of approval (step 416) to both the visa applicant and the appropriate authorities, e.g. local foreign embassy. If applicant fails to meet the application processing requirements, then the application will be denied (step 418), which will require notifying applicant of the denial (step 420). In some embodiments, depending on the reason for the denial, e.g. a known terrorist seeking entry into a country's borders, the foreign embassy's immigration protocol may mandate reporting to the authorities (step 422) such application and denial.

Figure 5:
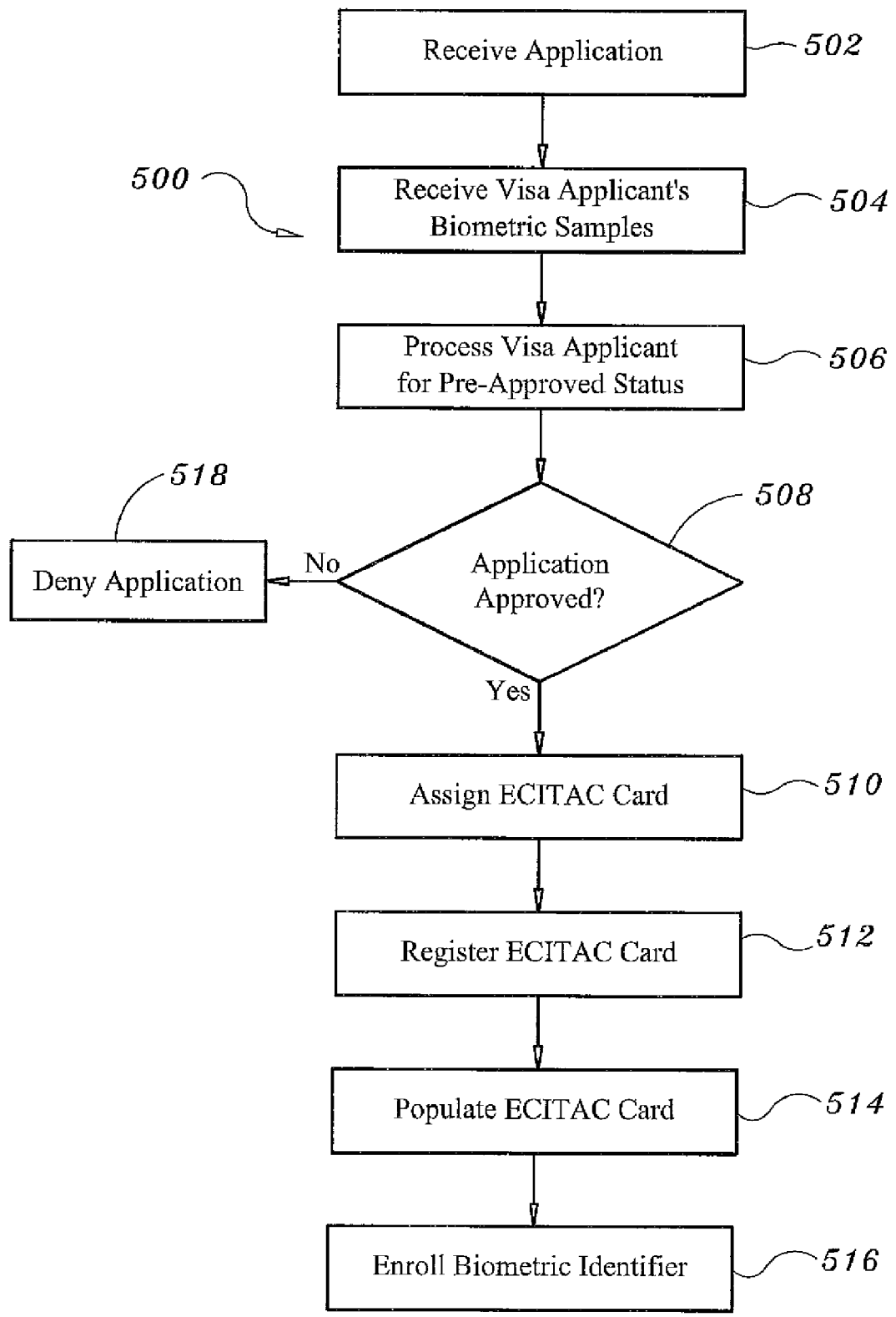
FIG. 5 is a sample flowchart of an exemplary detailed method of activating the ECITAC card for a pre-approved visa applicant in accordance with one embodiment

FIG. 5 is a sample flowchart of an exemplary detailed method 500 of activating the ECITAC card 100 for a pre-approved visa applicant in accordance with one embodiment. Method 500 comprises of receiving an application for an ECITAC card 100 (step 502) from a visa applicant, which would include the relevant documentation, e.g. a photograph, valid birth certificate, proof of citizenship, and the like. Visa applicant may also be required to submit biometric samples 112, e.g. fingerprints to be used as a subsequent biometric identifier 104 for the visa applicant. Method 500 receives visa applicant's biometric samples 112, 122' (step 504) and processes visa applicant for pre-approval status (step 506) for a travel visa in the identical manner as previously discussed in accordance with FIG. 4, i.e. conducting background verification check and the like. If the application is approved for an ECITAC card 100 (step 508), visa applicant will be assigned an ECITAC card 100 (step 510) where the ECITAC card number 124 is registered (step 512) as being assigned to the ECITAC card holder (step 512). Method 500 further includes populating the ECITAC card 100 with the visa applicant's information 106 (step 514) and/or other information that may be part of the data structures 200. Method 500 also includes electronically storing the biometric sample 112 on the electronic data card 102 by enrolling the biometric sample 112 (step 516) previously obtained as the biometric identifier 104 on the ECITAC card 100. If the application is not approved (step 508) it will be denied (step 518).

Figure 6:
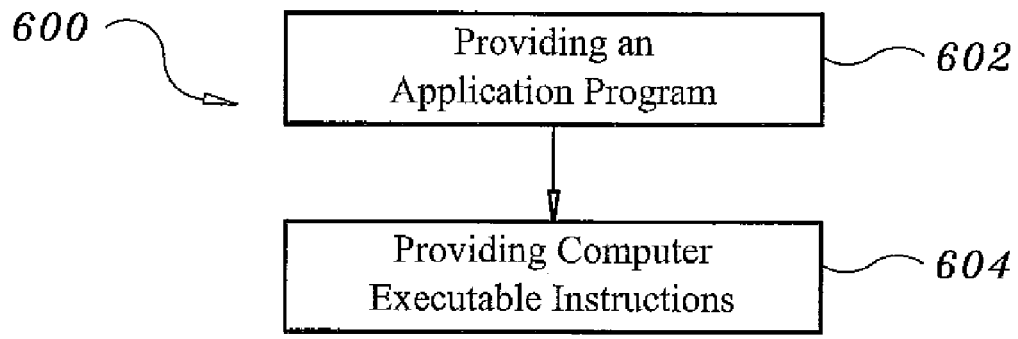
FIG. 6 is a block diagram representing an apparatus according to the various embodiments.

FIG. 6 is a sample flowchart of a block diagram of an exemplary method 600 of processing an ECITAC card 100 in accordance with an alternate embodiment. Method 600 comprising of providing an application program 306 (step 602) executable on a computer 304, where the application program 306 is capable of processing the information stored on the ECITAC card 100, i.e. a card number 124, biometric sample 112, biometric identifier 104, visa application information 106 and/or data structures 200 and the like.

Method 600 further comprises providing computer executable instructions 118 (step 604) executable by at least one computer processor 116' and configured to perform any one or more of the following: control the passport reader 302 to read an electronic data card 102; receive a biometric sample 112 used to verify the identity of the visa applicant; compare the biometric sample 112 with the biometric identifier 104 previously stored for the visa applicant; and review a background report 108 to determine the visa applicant's pre-approved status for a foreign visa at a local embassy.

ECITAC card 100 is selected from a group of electronic devices consisting essentially of smart cards, memory cards, and microprocessor cards, with memory means 110 embedded therein for storing visa application information 106 and or a biometric identifier 104. In some embodiments, ECITAC card 100 comprises of GPS location determining means 210 (not shown), where for example method 600 would further include determining the location of the ECITAC card 100.

Figure 7:
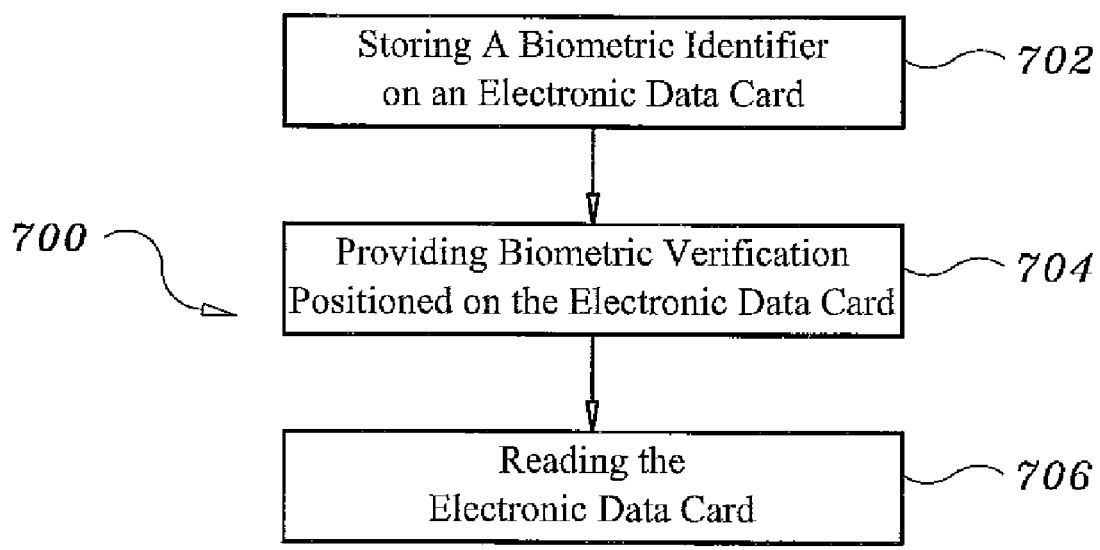
FIG. 7 is a block diagram representing an apparatus according to various embodiments.

FIG. 7 is a sample flowchart of a block diagram of an exemplary method 700 in accordance with an alternate embodiment. Method 700 includes electronically storing a biometric identifier 104 on an electronic data card 102, e.g. ECITAC card 100 (step 702); providing biometric verification means 114 (step 704) positioned on the electronic data card 102, where the biometric verification means 114 is configured for validating a visa applicant's biometric sample 112 by comparing the biometric sample 112 with the biometric identifier 104; and reading the electronic data card 102 (step 706) for verifying the visa applicant's pre-approval status for a travel visa at a local embassy. Reading the electronic data card 102 (step 706) may include accessing the electronic data card 102 via a passport reader 302 connected to a computer 304. Passport reader 302 may communicate with the computer 304 or the electronic data card 102 in a wired or wireless manner to retrieve the information stored within the electronic data card's memory means 110.

Stored within the electronic data card's memory means 110 may be any one or more of the following: a biometric sample 112, biometric identifier 104, background report 108, visa application information 106, or data structures 200. Visa application information 106 includes but is not limited to: pre-approved status, photograph, issuing country, passport number, surname, given names, address, nationality, date of birth, place of birth, gender, race, height, color of eyes, passport number, date of issue, passport expiration date, occupation, place of issue, authority or endorsement. Data structures 200 includes but is not limited to: card number, security parameters, visa application information, card validation information, activity log and global positioning system location information.

Biometric verification means 114 includes but is not limited to: fingerprint recognition means, hand geometry recognition means, palm geometry recognition means, iris recognition means, retina recognition means, speech recognition means and any other biometric verification means 114 that are known and used in the arts. Biometric verification means 114 may include at least one processor 116 positioned within the ECITAC card 100 and disposed in communication with, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry and such other biometric verification means 114 that are known and used in the arts.

Hardware and Operating Environment

This section provides an overview of exemplary hardware and the operating environments in conjunction with which embodiments of the inventive subject matter can be implemented.

A software program may be launched from a computer readable medium in a computer-based system 300 to execute the functions defined in the software program. Various programming languages may be employed to create software programs designed to implement and perform the methods 400, 500, 600 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 8 below.

Figure 8:
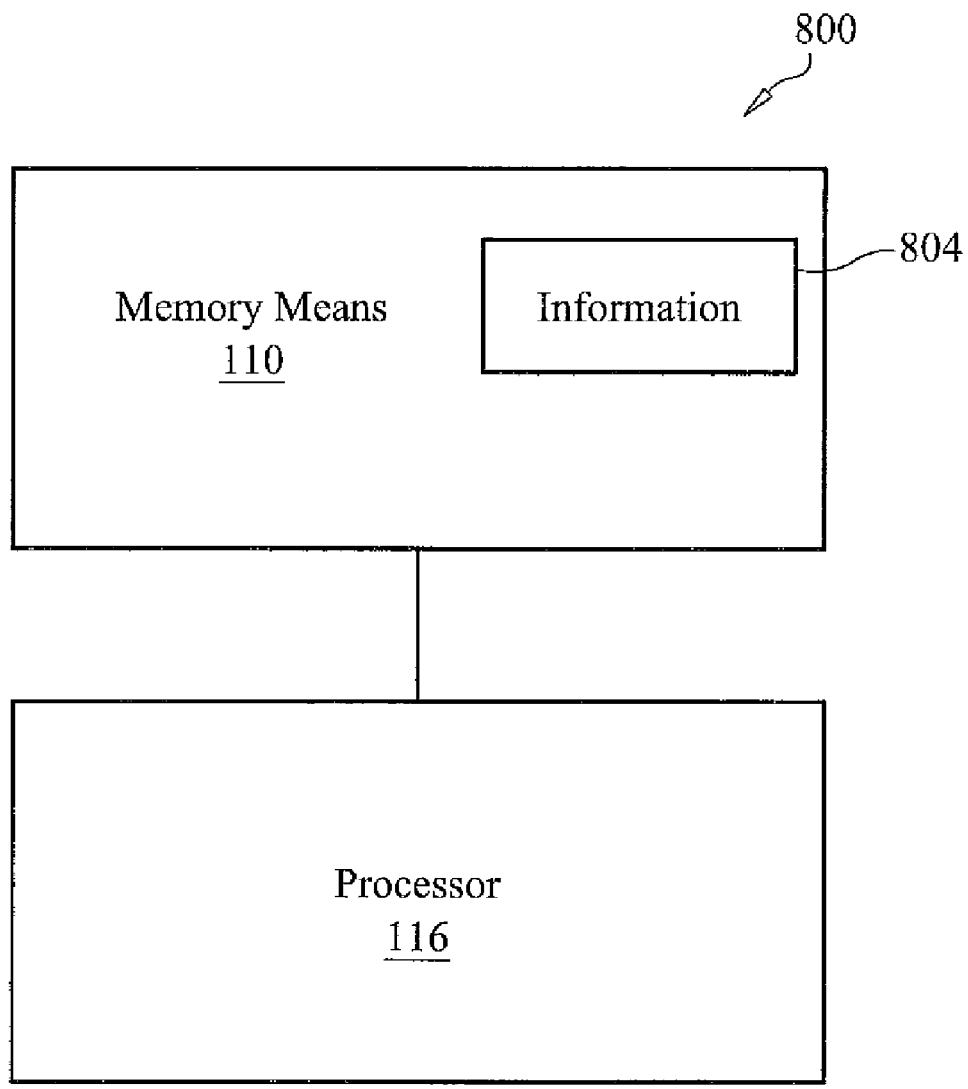
FIG. 8 is a block diagram 800 representing an apparatus 100 according to various embodiments.

FIG. 8 is a block diagram 800 representing an apparatus 100 according to various embodiments. Such embodiments may comprise a computer, a memory means 110, a magnetic or optical disk, some other storage device, or any type of electronic device or system. The apparatus 100 may include one or more processor(s) 116 coupled to a machine-accessible medium such as memory means 110 (e.g., a memory including electrical, optical, or electromagnetic elements). The medium may contain associated information 804 (e.g., computer program instructions, data, or both) which, when accessed, results in a machine (e.g., the processor(s) 116) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. A system comprising of:
   (a) an electronic data card configured for electronically storing thereon a biometric identifier;
   (b) biometric verification means positioned on the electronic data card, where the biometric verification means is configured for validating a visa applicant's biometric sample by comparing the biometric sample with the biometric identifier stored on the electronic data card or with a foreign embassy; and
   (c) a passport reader connected to a computer, wherein the passport reader is configured for reading the electronic data card for verifying the visa applicant's pre-approval status for a travel visa at the local foreign embassy where the visa applicant resides, wherein upon pre-approval the visa applicant need not return to a birth country to submit the visa application to the foreign embassy of an intended destination country.

2. The system of claim 1 further comprising:
   (a) an application program executable on a computer; and
   (b) computer executable instructions executable by at least one computer processor and configured to perform any one or more of the following:
      (i) control the passport reader to read an electronic data card;
      (ii) receive a biometric sample used to verify the identity of the visa applicant;
      (iii) compare the biometric sample with the biometric identifier previously stored for the visa applicant; or
      (iv) review a background report to determine the visa applicant's pre-approved status for visa processing at the local foreign embassy, wherein upon preapproval the visa applicant need not return to a birth country to submit a visa application to the foreign embassy of an intended destination country.

3. The system of claim 2, wherein the electronic data card is configured for being accessed by the application program executable on the computer.

4. The system of claim 1, wherein the pre-approved status may include but is not limited to: approved or denied.

5. The system of claim 1, wherein background report includes but is not limited to: information concerning criminal background check, verification of local address, bank account information, verification of education, flag indicating the pre-approved status of the visa applicant showing whether visa applicant qualifies for a travel visa from the local foreign embassy and flag indicating the pre-approved status of the visa applicant showing why visa applicant does not qualify for a travel visa from the local foreign embassy.

6. The system of claim 1, wherein the biometric verification means includes but is not limited to: fingerprint recognition means, hand geometry recognition means, palm geometry recognition means, iris recognition means, retina recognition means, speech recognition means.

7. The system of claim 1, wherein the electronic data card is configured for communicating with the computer or passport reader in any of the following manner: wirelessly or wired.

8. The system of claim 1, wherein the electronic data card is selected from the group of electronic devices comprising essentially of smart cards.

9. The system of claim 1, wherein the electronic data card includes memory means.

10. The system of claim 9, wherein the memory means may include any one or more of the following stored thereon: a biometric sample, biometric identifier, background report, visa application information, or data structures.

11. The system of claim 10, wherein visa application information includes but is not limited to: pre-approved status, photograph, issuing country, passport number, surname, given names, address, nationality, date of birth, place of birth, gender, race, height, color of eyes, passport number, date of issue, passport expiration date, occupation, place of issue, authority, contact information, current visa information, type of visa or endorsement.

12. The system of claim 10, wherein data structures includes but is not limited to: card number, security parameters, visa application information, card validation information, activity log and global positioning system location information.

13. The system of claim 1, further comprising location determining means for determining the location of the emerging country's international travel approval control card.

14. The system of claim 1, further comprising of a kiosk adapted to include at least one passport reader.

15. A method comprising:
   (a) electronically storing a biometric identifier on an electronic data card; and
   (b) providing biometric verification means positioned thereon the electronic data card, where the biometric verification means is configured for validating a visa applicant's biometric sample by comparing the biometric sample with the biometric identifier stored on the electronic data card or with a foreign embassy; and (c) reading the electronic data card for verifying the visa applicant's pre-approval status for a travel visa at a local embassy where the visa applicant resides, wherein upon pre-approval the visa applicant need not return to a birth country to submit a visa application to the foreign embassy of an intended destination country.

16. The method of claim 15, comprising:
(a) providing an application program executable on a computer for accessing an electronic data card; and
(b) providing computer executable instructions executable by at least one computer processor and configured to perform any one or more of the following:
  (i) control the passport reader to read an electronic data card;
  (ii) receive a biometric sample used to verify the identity of the visa applicant;
  (iii) compare the biometric sample with the biometric identifier previously stored for the visa applicant; or
  (iv) review a background report to determine the visa applicant's pre-approved status for visa processing at the local foreign embassy, wherein upon preapproval the visa applicant need not return to a birth country to submit a visa application to the foreign embassy of an intended destination country.

17. The method of claim 15, wherein the pre-approved status may include but is not limited to: approved or denied.

18. The method of claim 15, wherein background report includes but is not limited to: information concerning criminal background check, verification of local address, bank account information, verification of education, flag indicating the pre-approved status of the visa applicant showing whether visa applicant qualifies for a travel visa from the local foreign embassy.

19. The method of claim 15, wherein the biometric verification means includes but is not limited to: fingerprint recognition means, hand geometry recognition means, palm geometry recognition means, iris recognition means, retina recognition means, speech recognition means.

20. The method of claim 19, further comprising communicating in a wireless or wired manner.

21. The method of claim 20, wherein the electronic data card is selected from the group of electronic devices comprising essentially of smart cards.

22. The method of claim 21, wherein visa application information includes but is not limited to: pre-approved status, photograph, issuing country, passport number, surname, given names, address, nationality, date of birth, place of birth, gender, race, height, color of eyes, passport number, date of issue, passport expiration date, occupation, place of issue, authority, contact information, current visa information, type of visa or endorsement.

23. The method of claim 21, wherein data structures includes but is not limited to: card number, security parameters, visa application information, card validation information, activity log and global positioning system location information.

24. The method of claim 15, further comprising communicating with a passport reader or a computer.

25. The method of claim 15, further comprising accessing an electronic data card.

26. The method of claim 15, further comprising storing any one or more of the following in the electronic data card's memory means: a biometric sample, biometric identifier, background report, visa application information, or data structures.

27. The method of claim 15, further comprising determining the location of the emerging country's international travel approval control card.

28. The method of claim 15, comprising reading any one or more of the following: an electronic data card number, a biometric sample, biometric identifier, background report, pre-approval status or visa application information.

* * * * *